United States Patent
Minemura

(10) Patent No.: US 7,599,271 B2
(45) Date of Patent: Oct. 6, 2009

(54) OPTICAL DISK APPARATUS

(75) Inventor: Hiroyuki Minemura, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 754 days.

(21) Appl. No.: 11/051,186

(22) Filed: Feb. 7, 2005

(65) Prior Publication Data

US 2006/0077835 A1   Apr. 13, 2006

(30) Foreign Application Priority Data

Sep. 8, 2004   (JP) ............................ 2004-260410

(51) Int. Cl.
*G11B 7/00* (2006.01)
(52) U.S. Cl. ............. 369/59.11; 369/59.21; 369/124.11
(58) Field of Classification Search ........................ None
See application file for complete search history.

(56) References Cited

U.S. PATENT DOCUMENTS 5,691,857 A * 11/1997 Fitzpatrick et al. ....... 360/77.06
6,243,339 B1 * 6/2001 Spruit et al. ............. 369/53.13
6,269,062 B1   7/2001 Minemura et al.
7,295,502 B2 * 11/2007 Minemura ............... 369/59.11

\* cited by examiner

*Primary Examiner*—Joseph H Feild
*Assistant Examiner*—Parul Gupta
(74) *Attorney, Agent, or Firm*—Antonelli, Terry, Stout & Kraus, LLP.

(57) ABSTRACT

An optical disk apparatus has a highly accurate trial writing function corresponding to a PRML system and copes with a bad jitter of a 2Tw mark in order to realize an optical disk, the recording/reproduction of which is enabled in both a DVD and a Blu-ray Disc by a drive. After a reproducing signal is A/D-converted, error pulse generation is enabled corresponding to the PRML by detecting an edge signal level, and an error pulse is generated when the level exceeds a threshold. At the same time, trial writing that corresponds to the difference in the jitter of the 2Tw mark and a mark of 3Tw or more is enabled by providing multiple error pulse thresholds.

8 Claims, 21 Drawing Sheets

CASE 1: PRML CLASS NUMBER = EVEN (EDGE POINT = CLOCK POINT)

EDGE CONDITION:
$$y[i-1] \cdot y[i+1] < 0;$$
ERROR PULSE GENERATION CONDITION:
$$abs(y[i]) > Vth$$

CASE 2: PRML CLASS NUMBER = ODD (EDGE POINT ≠ CLOCK POINT)

EDGE CONDITION:
$$y[i] \cdot y[i+1] < 0;$$
ERROR PULSE GENERATION CONDITION:
$$abs((y[i]+y[i-1])/2) > Vth$$

SINE WAVE APPROXIMATION

DETECTION WINDOW = 35% Tw

DETECTION WINDOW = 50% Tw

DETECTION WINDOW = 65% Tw

DETECTION WINDOW = 35% Tw (2T), 65% (≥3T)

DETECT PATTERN COUNTS

ERROR PULSE WITH PATTERN ERROR FACTOR
EVALUATION FACTOR = (ERROR PULSE COUNT) + R×abs (DETECT-PATTERN − WRITE-PATTERN)

FIG. 18A
INITIAL STATE
FIG. 18B
MINIMIZING OF ERROR PULSE
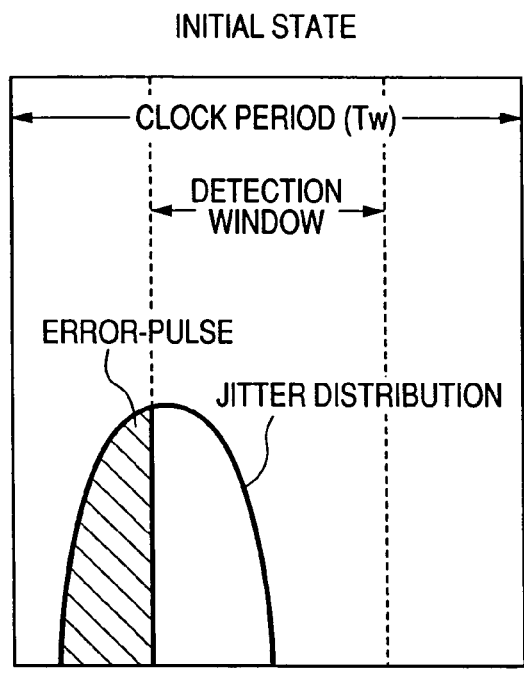
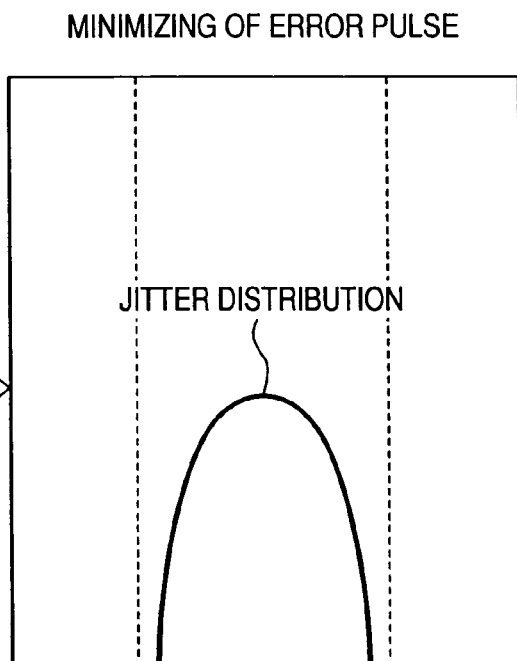

LEADING EDGE

TRAILING EDGE

OPTICAL DISK APPARATUS

CLAIM OF PRIORITY

The present application claims priority from Japanese application JP 2004-260410, filed on Sep. 8, 2004, the content of which is hereby incorporated by reference into this application.

CO-PENDING APPLICATIONS

U.S. patent applications Ser. No. 10/643,975, Ser. No. 10/774,587, and Ser. No. 10/933,321 are co-pending applications of the present application. The disclosures of these co-pending applications are incorporated herein by cross-reference.

FIELD OF THE INVENTION

The present invention relates to an optical disk apparatus that forms a recording mark, the physical property of which differs from another portion on a recording medium, and that records information.

BACKGROUND OF THE INVENTION

Optical disk media, such as a DVD-RAM and a DVD-RW, that use a rewritable type phase change optical recording material, have been available widely for general use. Recently, a larger capacity Blu-ray Disc, that deals with the video recording of high-definition television broadcasting, has been manufactured as a commercial product using a blue laser. In the future, the realization of an optical disk apparatus that enables recording/reproduction on both a DVD and a Blu-ray Disc by a drive is anticipated. The optimization of the power and pulse conditions of a recording laser beam, called "trial writing", is important in recording information in these high-density optical disks.

Usually, a jitter, that is a standard deviation of the shift between a data edge and a clock edge, is used to estimate the quality of a signal recorded in an optical disk. A measuring apparatus, such as an exclusive jitter analyzer, is necessary to measure the jitter. Because an expensive jitter analyzer cannot be incorporated in an optical disk apparatus, a signal estimation index was required instead of this expensive jitter analyzer.

As an example of a conventional trial writing technique, the technique of estimating jitter equivalently and optimizing the recording power using this value by generating a logical pulse, that is called an error pulse, and counting an error pulse count, instead of measuring the jitter directly, when the phase difference between the data edge and the clock edge exceeds a predetermined value, is disclosed in JP-A No. 320777/1998.

Moreover, a trial writing technique for a 4.7 GB DVD-RAM that uses an adaptive recording strategy of a table reference type conforming to the front and rear space length and mark length is disclosed in the International Laid-Open Patent Publication No. WO01/011614. In accordance with this technique, classification processing is applied by making an error pulse correspond to a table of the recording strategy, and a pulse condition of a recording laser beam is optimized so that the error pulse values of table items may be minimized. Practical classification processing requires two 4×4 tables. However, because a logical pulse, called an error pulse, is used to estimate a signal, the classification processing can be realized simply by a logic LSI.

[Patent document 1] JP-A No. 320777/1998

[Patent document 2] WO01/011614

As described previously, at the present time, when the use of a DVD has become widespread, a fast recording/reproduction speed is becoming a most important technical development problem. Because the noise effect increases when a signal is reproduced at high speed, a PRML (Partial Response Maximum Likelihood) method that improves the S/N (Signal-to-Noise) ratio effectively is becoming indispensable as a binary system of a reproducing signal instead of a conventional direct slice method. The PRML method requires a process of digitalizing the reproducing signal at every clock using an A/D (Analog-to-Digital) converter. Necessarily, a PLL (Phase-Locked Loop) circuit also changes from a conventional analog system to a digital system. In the PLL circuit of the digital system, a VCO (Voltage Controlled Oscillator) circuit is operated so that the level of the reproducing signal at an edge point may approach zero, instead of directly comparing the phase difference between a data edge and a clock edge. Because a conventional error pulse generation circuit adapts to a phase error detection circuit of the PLL of an analog system, it could not be adapted to the PLL of a digital system.

When a PRML method and a digital PLL are adopted in this manner, a conventional error pulse generation circuit will not function. When a new signal estimation index is introduced instead of an error pulse, the configuration of a conventionally developed logic LSI, and a control program resource will not be able to be used effectively.

When a detection window clock period (PLL clock period) is Tw, the length of the shortest signal recorded in a DVD is 3 Tw. In a DVD, the jitter of a repetition signal having the shortest signal length is about 6%, and is satisfactory equally with the jitter of a random signal so that ample reliability may be obtained by reproducing the signal using a conventional direct slice method. On the other hand, in a Blu-ray Disc, the length of the shortest signal recorded to improve code efficiency is 2 Tw. The jitter of the repetition signal having the shortest signal length is about 10%, and the quality is bad in comparison with the jitter of the random signal. Accordingly, in the methods disclosed in the above-referenced JP-A No. 320777/1998 and WO01/011614, many error pulses are generated from the edge of a 2 Tw mark, and error pulse is generated from the edge of a 3 Tw or more mark. Accordingly, in order to obtain a recording condition of the 2 Tw mark, because the minimum value of an error pulse count is hard to detect, and the error pulse count is kept at 0 even if the recording condition of the 3 Tw or more mark is changed, the recording condition can not be obtained accurately.

SUMMARY OF THE INVENTION

It is an object of the present invention to provide an optical disk apparatus having a highly accurate trial writing function that deals with a PRNL method and copes with a bad jitter of a 2 Tw mark in order to realize an optical disk apparatus that enables recording/reproduction in both a DVD and a Blu-ray Disc by a drive. To achieve this result, the following two problems are to be solved by the present invention.

(Problem 1) An attempt is made to generate an error pulse from a PRML circuit and to be able to make effective use of conventional logic LSI and control software resources.

(Problem 2) An attempt is made to be able to determine a recording condition with high accuracy corresponding to a difference in the jitter of the 2 Tw mark and a 3 Tw or more mark.

First, a means for solving the (Problem 1) will be described, taking a DVD-RAM as an example.

FIG. 2 is a characteristic diagram showing an error-pulse detection principle. The detection window clock period Tw for binarization is the same as the clock pulse period. The error-pulse detection window clock period is made narrower than the period Tw. Accordingly, in edge shift distribution (=jitter distribution), the edge which protrude outside of an error-pulse detection window is converted into an error-pulse. Consequently, when the error-pulse (logical pulse) is minimized, a write pulse condition under which an edge shift is minimal can be obtained.

FIG. 3 shows an error pulse generation condition corresponding to a data row in which a reproducing signal was sampled at every clock and converted digitally corresponding to a PRML method. In the drawing, an edge level is reduced to zero. Because the reproducing signal is sampled at every clock, absolute value of a sampling level at an edge point increases as the edge shift increases. Accordingly, in order to generate an error pulse, the absolute value of the sampling level at the edge point should be compared with a threshold. The PRML method includes a case (Case 1 in the drawing) where an edge position of the reproducing signal is sampled, and a case (Case 2 in the drawing) where it is shifted only for a half clock and sampled, according to the selection of a class number. With regard to each case, an edge condition and the error pulse generation condition are collected below. In the drawing, the reproducing signal sampled in the "i"th place is y[i], the edge level is 0, and the level threshold for generating the error pulse is Vth.

(Case 1) When an edge point is a sampling point, Edge condition: $y[i-1] \times y[i+1] < 0$ Error Pulse Generation Condition: $|y[i]| > Vth$ (Case 2) When an edge point is located between two sampling points, Edge detection condition: $y[i-1] \times y[i] < 0$ Error Pulse Generation Condition: $|(y[i-1]+y[i])/2| > Vth$ In the Case 2, because an edge level is not sampled directly, the edge level is handled as the mean value of the levels at two sampling points. By using such a method, a single error pulse that corresponds to the edge is generated when an edge shift is basically higher than a threshold.

FIG. 4 is a graph showing a sampled reproducing signal data row, a binary signal (hereinafter referred to as an NRZ signal), and an error pulse in more detail to facilitate an understanding of the present invention. The reproducing signal is standardized within ±1 through an AGC (Automatic Gain Control) circuit before it is A/D-converted. The drawing shows the case where the trailing edge shift of the 4 T mark is large in the 8 T-3 T-3 T-3 T-4 T-3 T pattern. In the above description, an example in which the absolute value of the sampling level and the threshold Vth is compared was considered. On the contrary, the drawing shows that the error pulse having a 1 Tw clock period is generated when the sampling level at an edge point is outside this range, assuming that the threshold is ±Vth. With regard to the NRZ signal, a mark is set to "1" and a space is set to "0" in accordance with the custom, and the mark shows a reproducing signal whose reflectivity is smaller. These are illustrated along with the general characteristics of a phase change optical disk of the type used in a DVD-RAM. In the trailing edge of the 4 T mark, the sampling point becomes larger than Vth, and an error pulse having the 1 Tw clock period is generated. The error pulse clock pulse should also be 2 Tw because the minimum run length of a DVD is 3 Tw.

FIG. 5 shows the configuration of an error pulse generation circuit. In order to simplify the description here, the drawing shows a case where the detected threshold is one. After a reproducing signal 50 is equalized by a DVD standard (analog) equalizer 11, the signal is sampled at every clock by an A/D converter 12. An edge level detector 21 detects the level of an edge point that satisfies the edge condition shown above, and an error pulse generator 22 compares the detected level of the edge point and an error pulse detection threshold 54 and generates an error pulse 52.

Next, a threshold Vth will be described. The Vth value must reflect a data edge shift.

FIGS. 6A and 6B show an eye pattern of a reproducing signal for a DVD-RAM. This is calculated using a scalar diffraction simulation. FIG. 6A shows a head readout wave output from an optical head. Because an edge position depends on mark length, an edge shift is too large on the whole to be binarized satisfactorily. FIG. 6B is an equalized wave that has been equalized by a 3-Tap FIR filter (tap coefficient=[-0.3, 0, 1.6, 0, -0.3]) that is the DVD-RAM standard equalizing condition and a 6th order Bessel LFP. The edge shift is improved greatly.

In a signal whose edge shift was improved by appropriate waveform equalization in this manner, an edge position is aligned independently of a mark length. At this time, when attention is paid to the fact that the inclination of a reproducing signal is also aligned in the vicinity of an edge point, a method of setting the error pulse threshold Vth can be obtained simply.

FIG. 7 shows sign wave approximation in which a 3 T repetition signal that is the minimum run length was superimposed on an equalized reproducing signal. Because appropriate equalization processing is applied, the inclination of the reproducing signal is aligned in the vicinity of an edge point, and the reproducing signal in the vicinity of the edge point makes it possible to perform sine wave approximation independently of mark length. When the reproducing signal approaches to a sine wave in the vicinity of the edge point, the relationship between an error pulse detection window clock period (direction of time) and the error pulse detection threshold Vth (direction of a level) can be decided uniquely.

FIG. 8 is a graph showing the relationship between an error pulse detection window clock period and an error pulse detection threshold. The detection threshold Vth standardizes the one-side amplitude of a reproducing signal for Sop. As described previously, when the signal amplitude is standardized within ±1 through use of an AGC circuit, Sop=1. Moreover, the ratio of the signal amplitude of the densest signal (3 Tw) to the coarsest signal (14 Tw) is defined as resolution, and the relationship is shown in the case where the resolution ranges from 10% to 100%. In case of a DVD, the resolution ranges from 30% to 60%. According to JP-A No. 320777/1998, the proper detection window clock period is said to range from 40% to 60%. Accordingly, the detection threshold Vth/Sop, in which the region hatched in the drawing is standard, should be set within the range of 0.08 to 0.18.

The principle of an error pulse generation method, the circuit configuration, and the detection threshold setting range were described above. As a result, the (Problem 1) was solved.

Next, the means for solving the (Problem 2) will be described. Here, a solution is described with respect o a method for calculating a proper recording condition of a DVD-RAM disk as an example by using an optical head having the numerical aperture 0.65 of an objective lens.

FIG. 9 shows the distribution of reproduction jitter of a test-manufactured write-once type Blu-ray Disc. Here, a signal was equalized by a 7th order ripple filter using a PR(1,2,2,1)ML as a PRML class so that the signal quality may be 10 optimum. As shown in the figure, the total jitter is 9.1%. Among them, the jitter of the edge of 3 Tw or more is 5.3%, while the jitter of the edge including 2 Tw is 11%, which is twice as high, and the quality is bad.

FIG. 10 shows the trial IS writing of a Blu-ray Disc. In a conventional method, because an error pulse detection threshold (detection window clock period DW) is selected, when the write pulse clock period or the value of an edge position is changed, many error pulses are generated from a 2 Tw mark, and the minimum condition is hard to obtain. At the same time, because only a few error pulses are generated from a mark of 3 Tw or more, even if the write pulse value is changed, the range in which an error pulse count is reduced to zero is wide. Accordingly, the optimum condition is hard to detect. Originally, in order to detect an edge shift according to a write pulse satisfactorily, it is important to set an error pulse detection threshold to almost the same value as the extension of the distribution of the jitter. As a result of this, an error pulse is generated with the best sensitivity according to the change of the write pulse condition. Hereupon, in accordance with the present invention, as shown in the figure, the error pulse detection threshold was set independently in 2 Tw and 3 Tw or more. Consequently, the optimum recording condition can be obtained by selecting the write pulse condition, so that the error pulse can be minimized in all marks.

FIGS. 11A to 11C show experimental results in which the relationship between a write pulse condition and an error pulse count was measured practically. Here, the relationship between a shift of the write pulse and the error pulse was measured using the foregoing test-manufactured write-once type Blu-ray Disc with regard to TSFP (2,2) (leading edge of the 2 Tw mark after the 2 Tw space), TSFP(3, 3) (leading edge of the 3 Tw mark of the 3 Tw space), and TSFP(4,4) (leading edge of the 4 Tw mark after the 4 Tw space), when the error pulse detection threshold is 35% Tw, 50% TW, and 65% Tw, respectively. As shown in the drawing, the actual measurement result was the same as the foregoing schematic depiction.

FIG. 12 is a graph showing an experimental result in which the relationship between a recording pulse condition and an error pulse count was measured using two types of error pulse detection thresholds. The detection threshold of the 2 Tw mark was set to 65% Tw, and the detection threshold of the mark of 3 Tw or more was 35%. In the vicinity of the starting point, the relationship between the write pulse shift and a counted value of the error pulse is improved almost uniformly, and the optimum condition (=the starting point in the drawing) was able to be obtained satisfactorily. The reduction of the error pulse that can be seen when the write pulse shift is 20% or more is affected, for example, when the 3 Tw mark followed by the 3 Tw space is judged by the 4 Tw mark followed by the 3 Tw space, and a reproduction error occurs. The method for solving this problem will be described in conjunction with the embodiments. With this, the (Problem 2) of the present invention was solved.

By using an optical disk apparatus, the present invention provides, corresponding to the optical disk apparatus that mounts a trial writing function that uses a conventional error pulse, also when a PRML reproduction system for high speed is mounted, the trial writing by the error pulse can be executed continuously as is. At the same time, a recording condition was able to be set with high accuracy by providing multiple error pulse detection thresholds, and setting the error pulse detection thresholds of 2 Tw mark and the mark of 3 Tw mark or more proper, respectively. The following two effects are obtained.

(Effect 1) An attempt was made to generate an error pulse from a PRML circuit, and to be able to make effective use of conventional logic LSI and control software resources.

(Effect 2) An attempt is made to be able to determine a recording condition with high accuracy corresponding to a difference in the jitter of the 2 Tw mark and the mark of 3 Tw or more.

BRIEF DESCRIPTION OF THE DRAWINGS

Preferred embodiments of the present invention will be described in detail based on the drawings, wherein:

FIGS. 6A and 6B are eye patterns of a DVD-RAM reproducing signal, wherein FIG. 6A shows a head readout wave output from an optical head, FIG. 6B shows an equalized wave;

FIGS. 18A and 18B are diagrams showing a concept of the trial writing that optimizes the write pulse condition;

DETAILED DESCRIPTION OF THE PREFERRED EMBODIMENTS

The details of the present invention will be described below with reference to the drawings.

First Embodiment

Trial Writing Circuit

Figure 1:
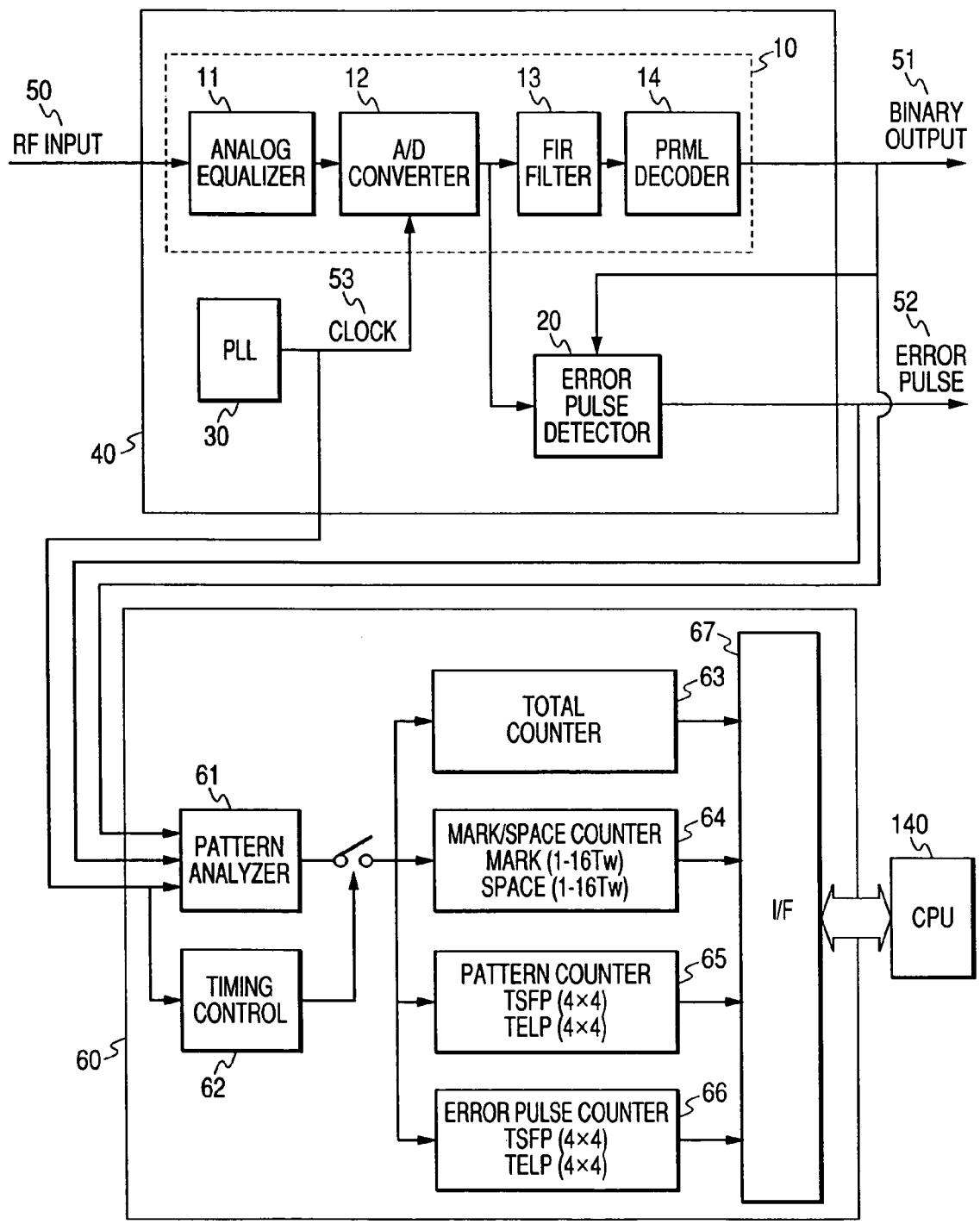
FIG. 1 is a block diagram showing an embodiment of a trial writing circuit suitable for an optical disk apparatus of the present invention.
Figure 2:
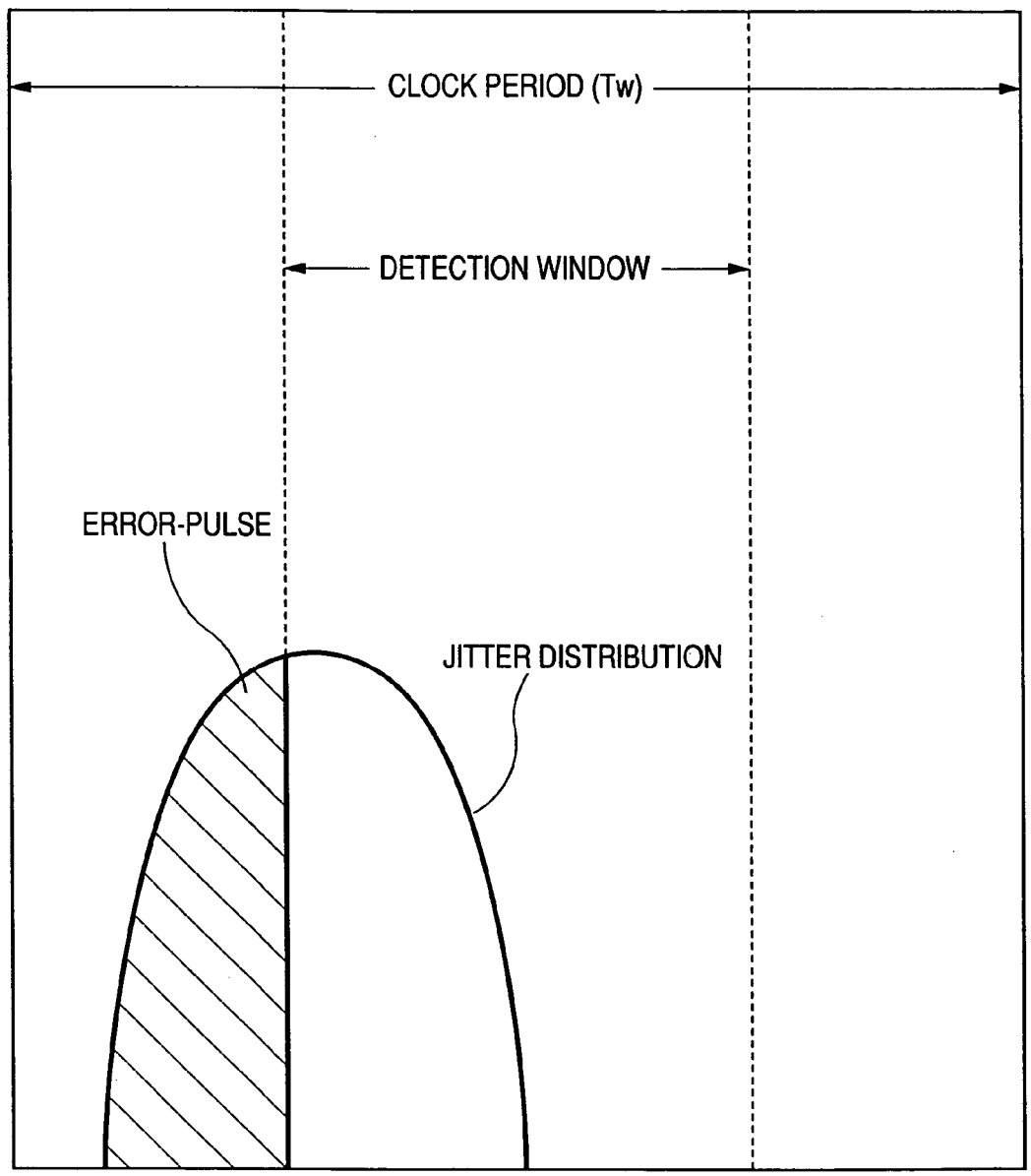
FIG. 2 is a characteristic diagram showing an error pulse detection principle.

FIG. 1 shows an embodiment of a trial writing circuit suitable for an optical apparatus of the present invention. The circuit has a reproducing signal processing circuit 40 and a logical signal processing circuit 60. The reproducing signal processing circuit 40 has a data reproduction circuit 10 of a PRML system, an error pulse generation circuit 20, and a PLL circuit 30. After a reproducing signal 50 that has been output from a head is equalized by an analog equalizer 11, the signal is sampled at every clock by an A/D converter 12. After this signal is equalized by a FIR filter 13, the signal is binarized by a PRML decoder 14, and a binary signal 51 is output. With regard to the generation of an error pulse, the signal sampled by the AID converter 12 is assumed as an input, and a level at an edge point is detected by an error pulse detector 20 which has an edge level detector and an error pulse generator, which compares the edge point level and an error pulse detection threshold and generates an error pulse 52. The PLL circuit 30 generates a clock from a reproducing signal, and it supplies the clock to each circuit.

The logical signal processing circuit 60 receives the binary signal 51, the error pulse 52, and a clock 53 as input signals. A pattern analyzer 61 classifies a pattern into a 4×4 table at the leading and trailing edges, respectively, in the same manner as a recording strategy. A timing control 62 performs timing control for integrating these pulses in a specified region, usually, in a sector in case of a DVD-RAM. A total counter 63 splits the specified region into multiple regions, and integrates all error pulses, as disclosed in JP-A No. 320777/1998. A mark/space counter 64 adds a mark and a space in separate length units. A pattern counter 65 and an error pulse counter 66 correspond to the above-mentioned 4×4 table. The former counts the number of edge patterns, and the latter counts error pulses in edge pattern units. In trial writing, a write pulse condition should be selected using an occurrence frequency of an error pulse in which the value of the measured error pulse counter 66 is divided by the value of the pattern counter 65, so that this occurrence frequency may be minimized.

At this time, the value of the mark/space counter 64 and the value of the pattern counter 65 are monitored and compared with the number of separate edges included in the recorded trial writing pattern. Consequently, when these differences are large, a defect, and an abnormality in the locked state of a PLL clock are monitored. Moreover, when a write pulse is changed greatly, for example, the intention of recording a 3 T mark is very important even for detecting an abnormal case where the pulse width is too wide and a 4 T mark will be recorded. In order to minimize the error pulse count and optimize the write pulse, trial writing must be executed only within the range where these abnormal states are not detected. Only when such a protection mechanism is mounted, an edge shift of less than 5%/Tw can be realized in a drive apparatus.

When these counter values are fetched in a CPU 140 through an interface 67 and are processed appropriately, the trial writing is executed. Further, the value of the total counter 63 is used for the trial writing when recording power is determined, as disclosed in JP-A No. 320777/1998.

In order to fix a recording condition using this circuit, a condition under which error pulse counts are minimized should be found in a state in which a specific pattern is recorded in a disk changing power and pulse conditions, and the specific pattern is reproduced, then an abnormal state is not detected.

FIGS. 13 to 16 show another embodiment of a reproducing signal processing circuit of the present invention. In each of the drawings, only reproducing signal processing is shown, and the items common to FIG. 1 are used with regard to a logical signal processing circuit.

Figure 3:
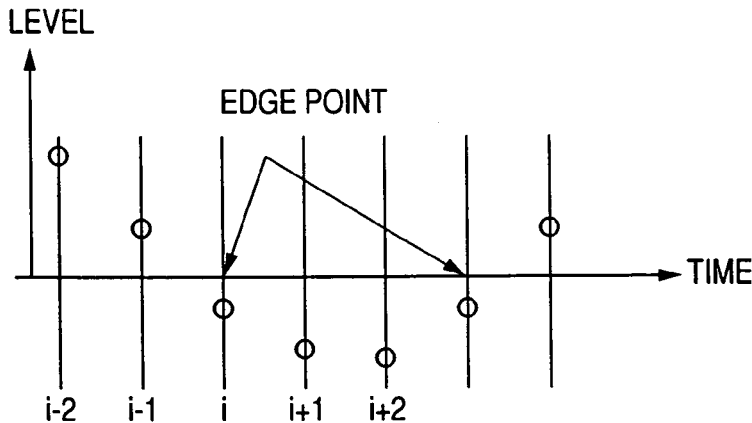
FIG. 3 is a diagram which shows an error pulse generation condition relative to a data row in which a reproducing signal is sampled at every clock and is digitally converted, corresponding to a PRML system.
Figure 3:
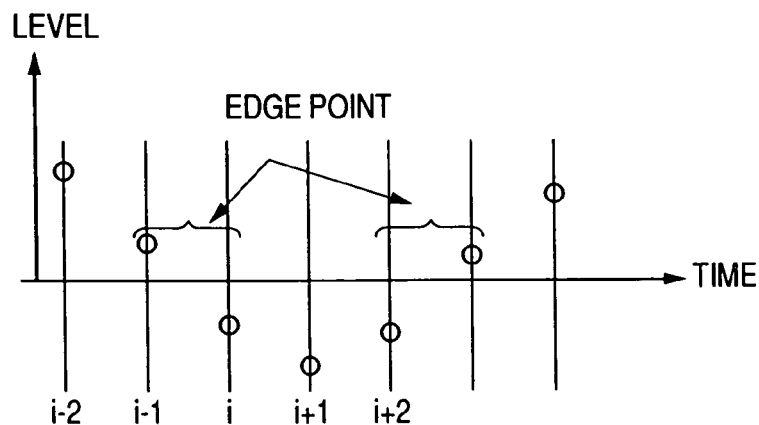
Figure 4:
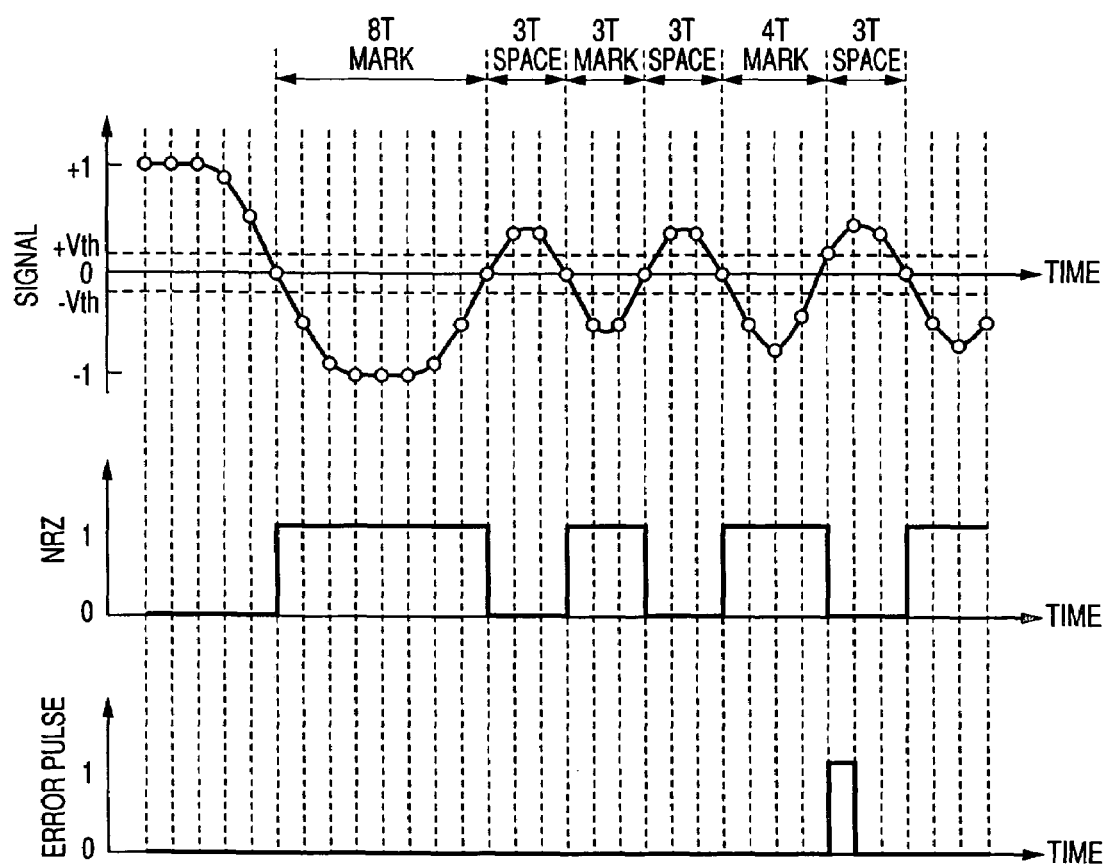
FIG. 4 is a graph showing the data row of S the sampled reproducing signal, a binary signal, and an error pulse in more detail to facilitate an understanding of the present invention.
Figure 5:
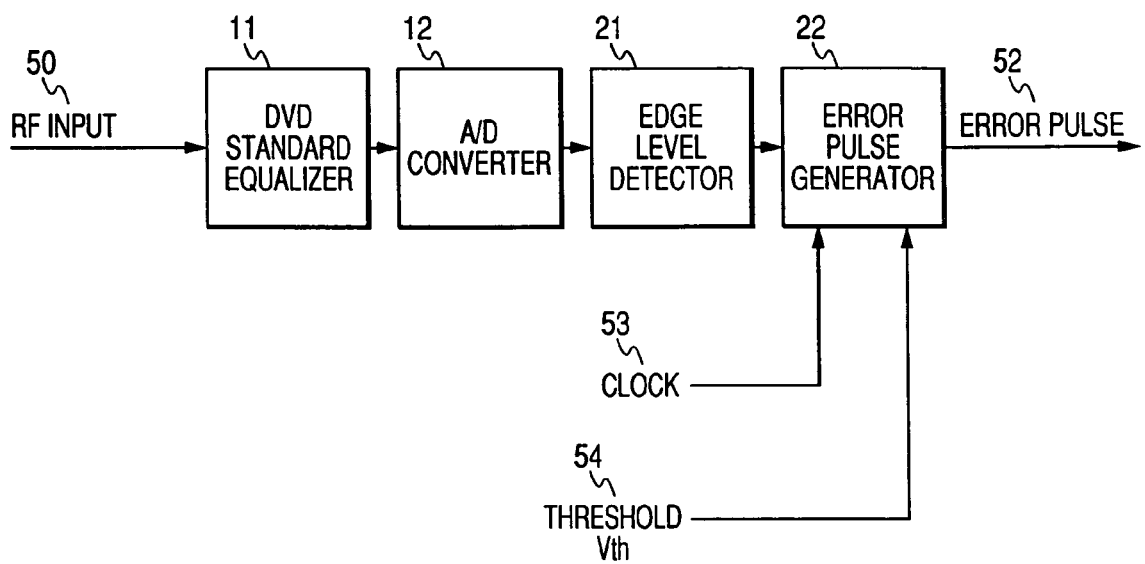
FIG. 5 is a block diagram showing the configuration of the error pulse generation circuit.
Figures 6A, 6B:
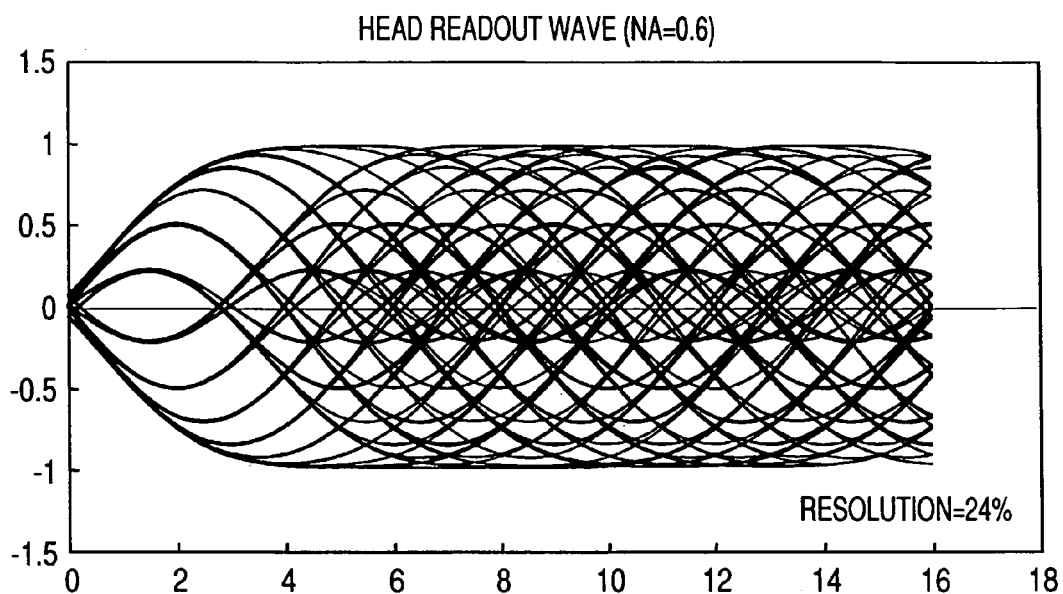
Figure 7:
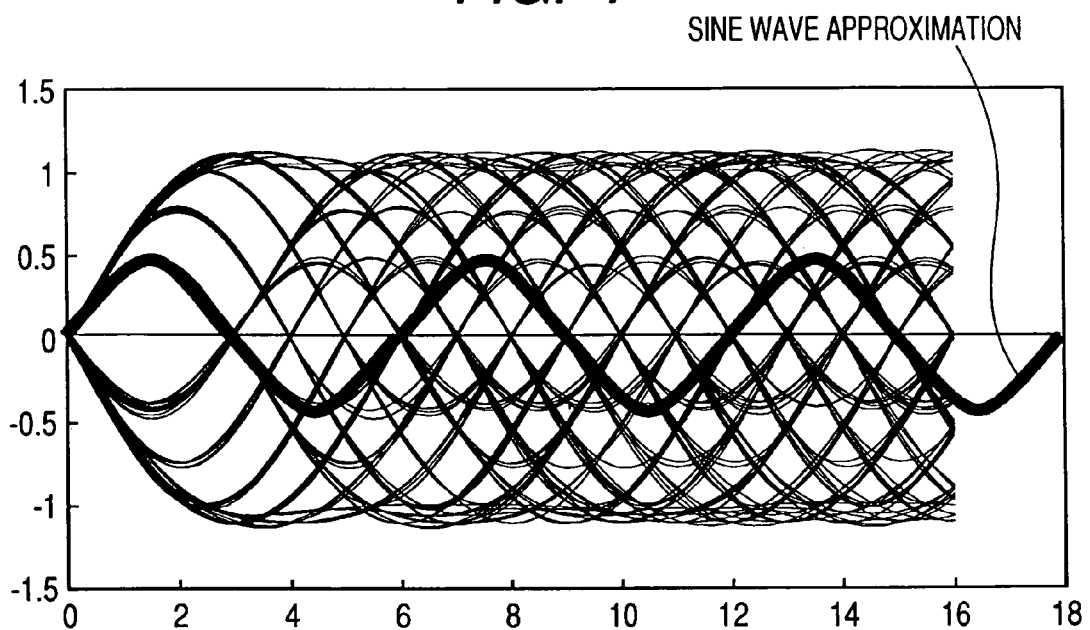
FIG. 7 is an eye pattern which shows sine wave approximation in which a 3 T repetition signal was superimposed on an equalized reproducing signal.
Figure 8:
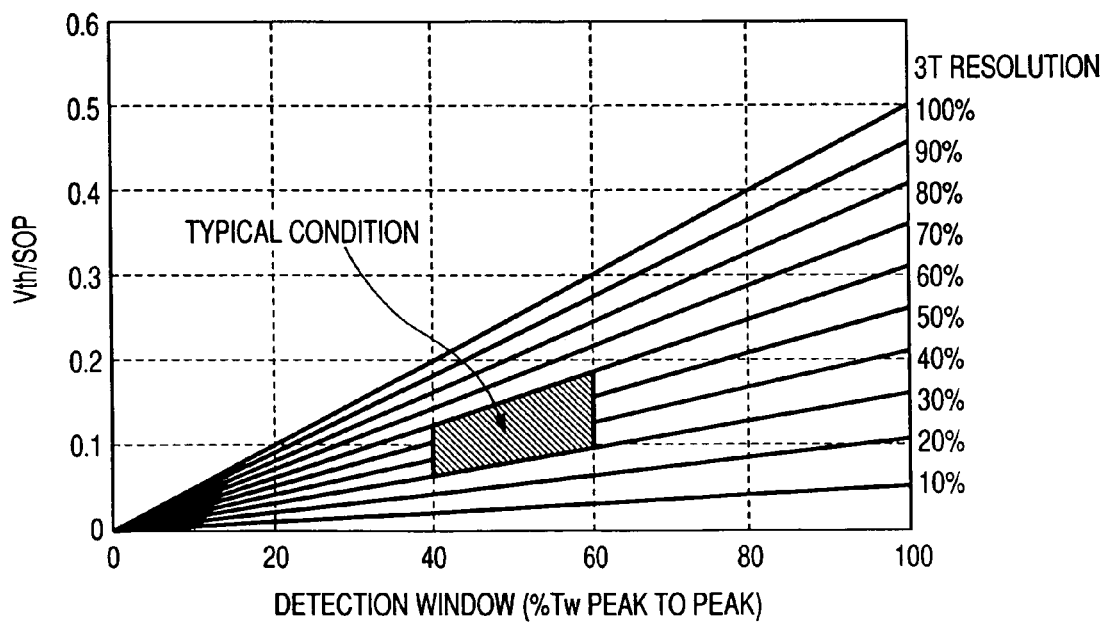
FIG. 8 is a graph showing the relationship between an error pulse detection window cock period and an error pulse detection threshold.
Figure 9:
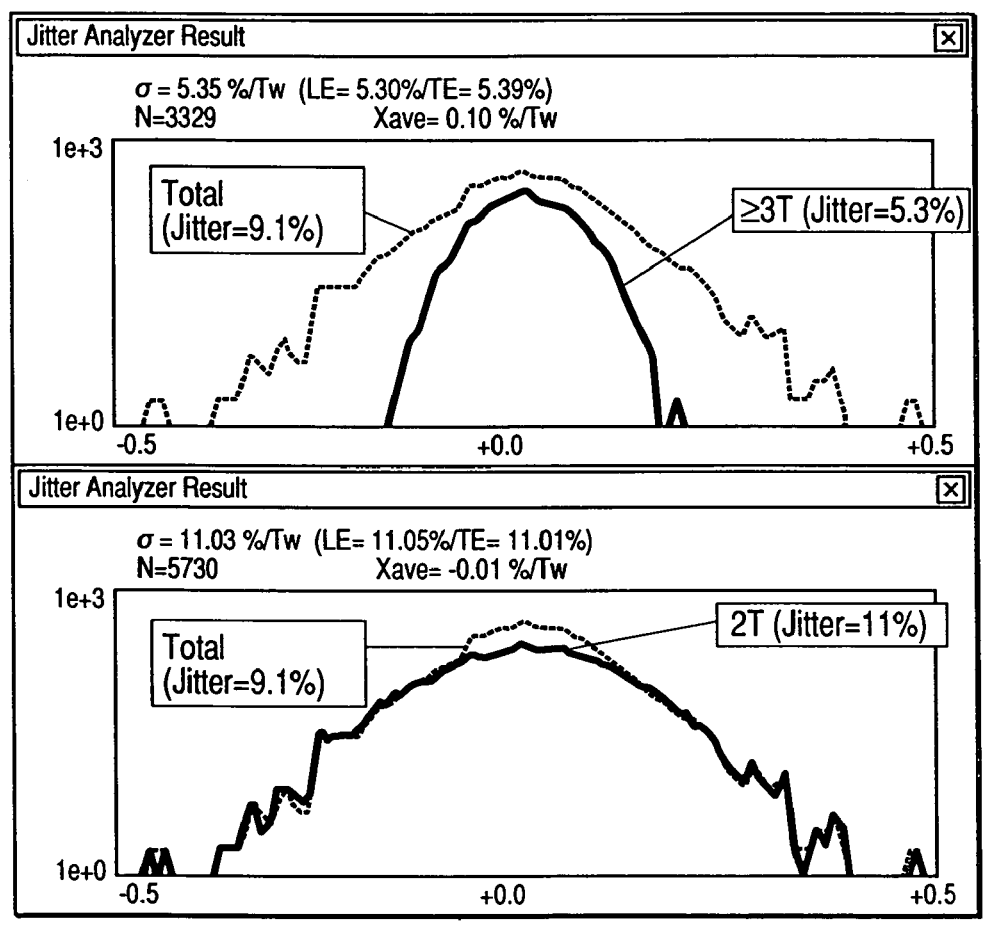
FIG. 9 is a diagram which shows distribution of a reproduction jitter of a test-manufactured write-once type Blu-ray Disc.
Figure 10:
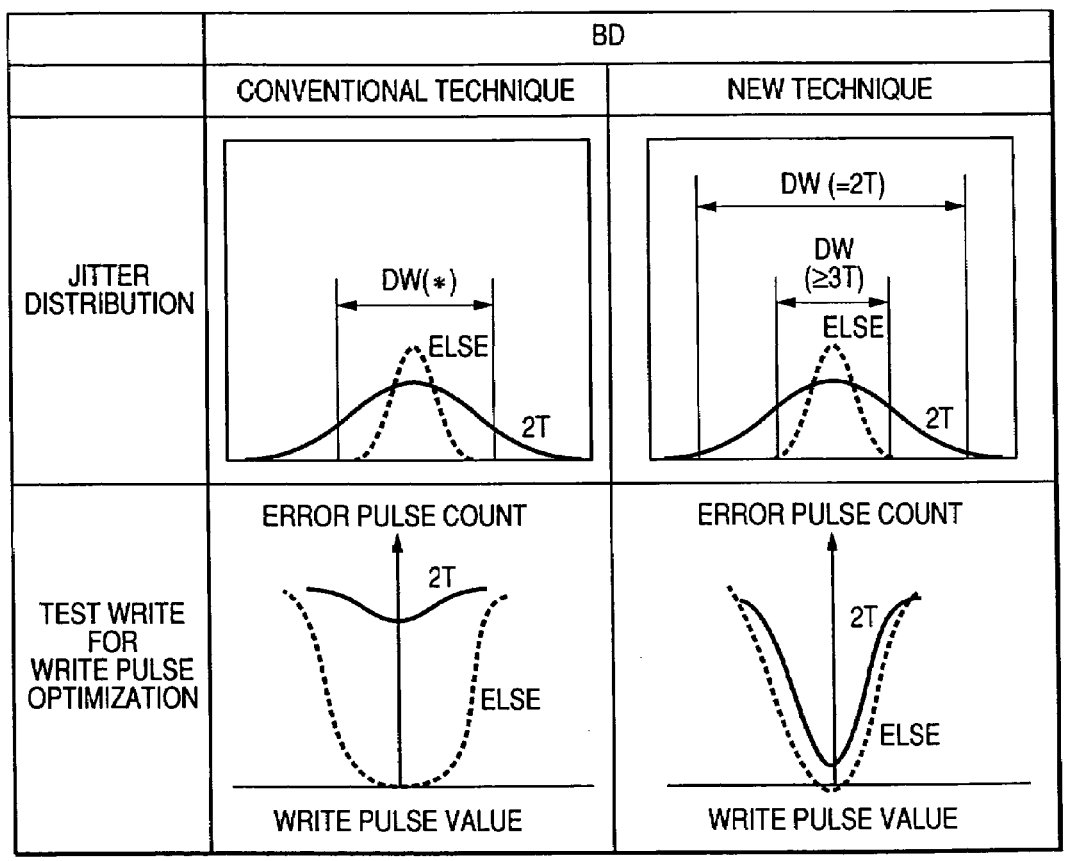
FIG. 10 is a diagram showing the trial writing of the Blu-ray Disc.
Figure 11A:
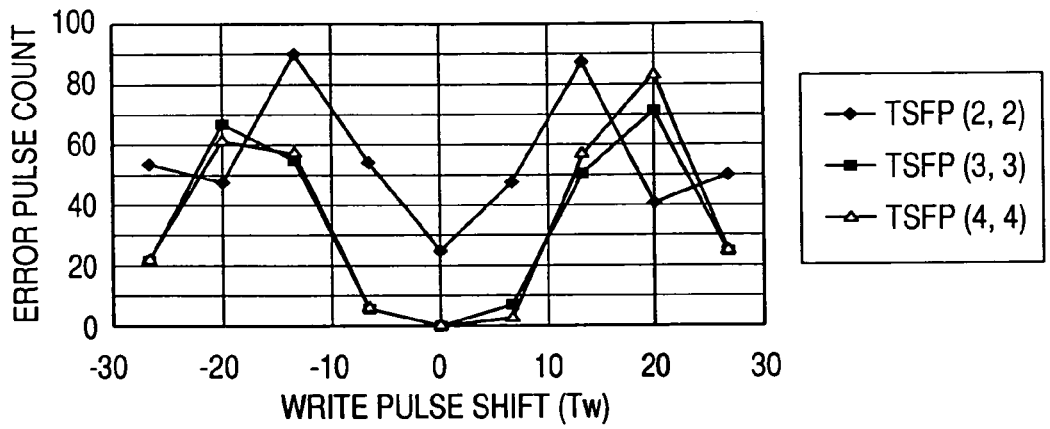
FIGS. 11A to 11C are graphs which show a result in which the relationship between an error pulse detection window clock period and an error pulse count was measured.
Figure 11B:
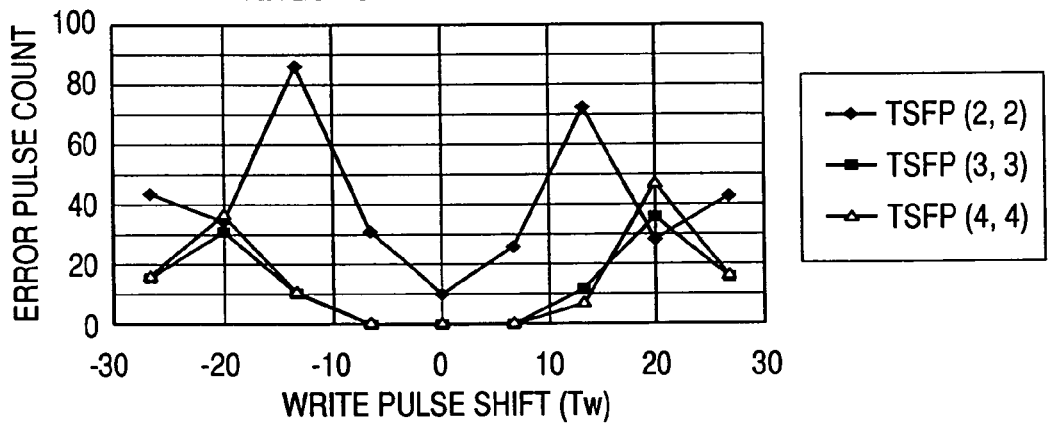
Figure 11C:
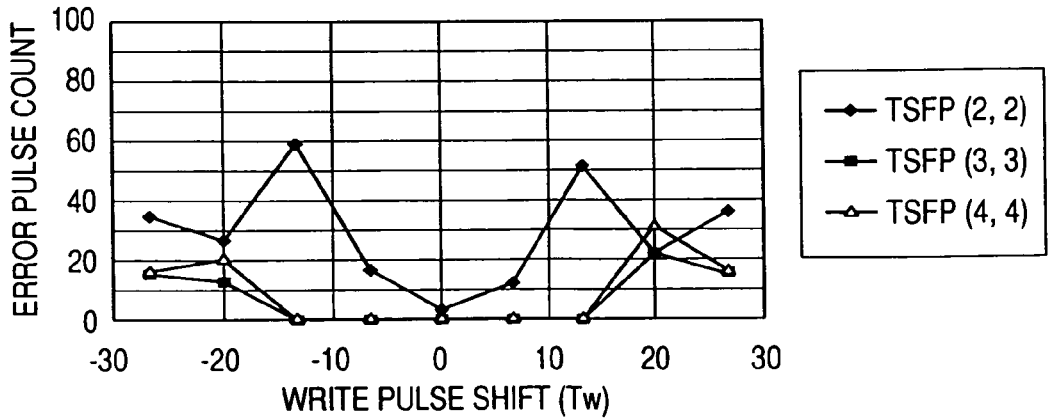
Figure 13:
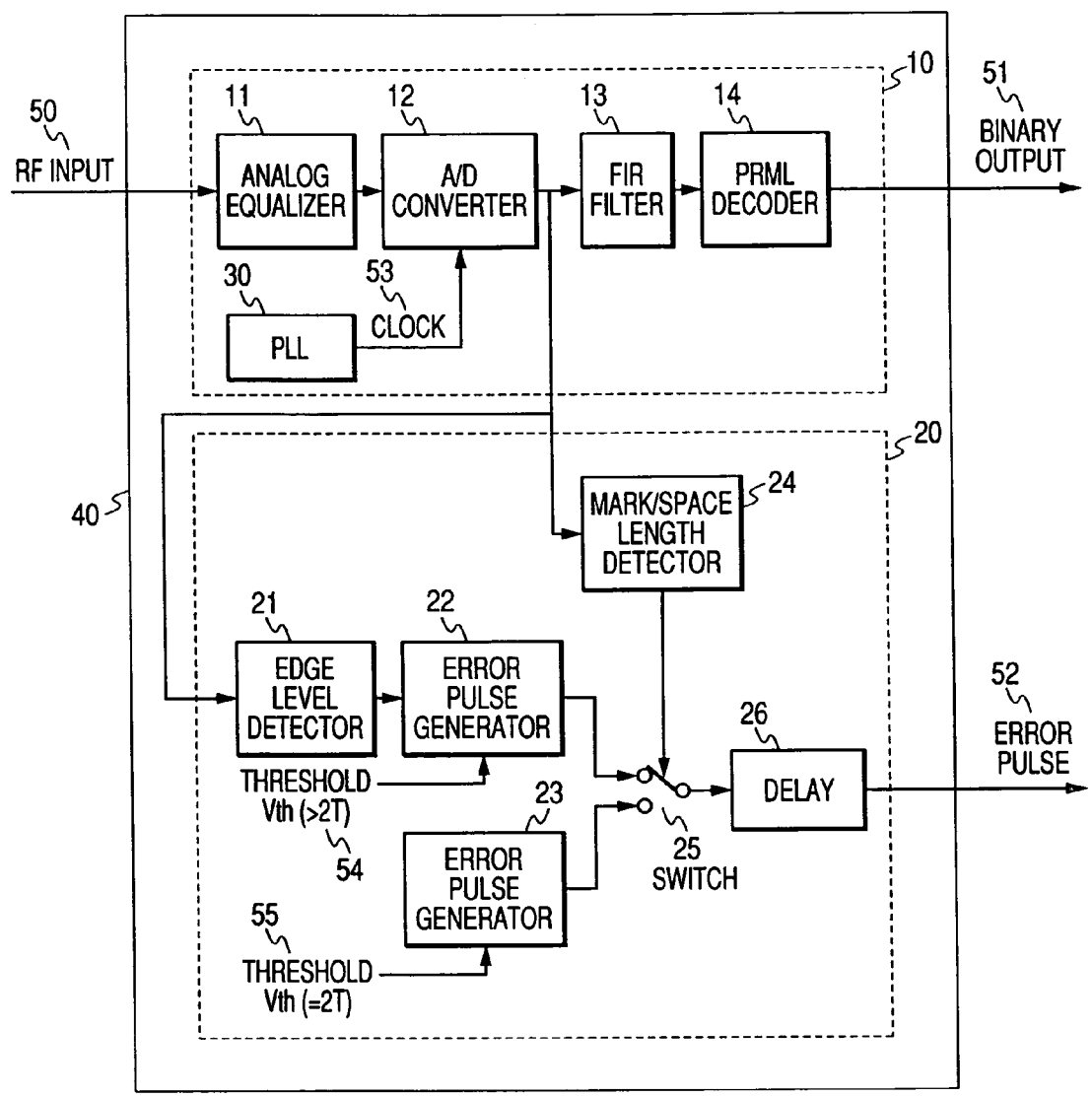
FIG. 13 is a block diagram showing an embodiment of the trial writing circuit suitable for the optical disk apparatus of the present invention.

FIG. 13 shows another configuration of the reproducing signal processing circuit of the present invention. In the drawing, an error pulse generation circuit has an edge level detector 21, error pulse generators 22 and 23, a mark/space length detector 24, a switch 25, and a delay apparatus 26. After a reproducing signal 50 that has been output from an optical head is equalized by an analog equalizer 11, the signal 10 is sampled at every clock by an AID converter 12 and guided to the edge level detector 21. An edge level detector detects the level of an edge from the condition shown in FIG. 3, and sends this value to the error pulse generators 22 and 23. The error pulse generators 22 and 23 compare an error pulse detection threshold 54, a value 55, and the edge level, and generate an error pulse. The mark/space length detector 24 judges which error pulse of the error pulse generator 22 or 23 to select from the pattern of the mark length of a reproducing signal, or the mark length and the space length before and, after the edge, and controls the switch 25, and then performs error pulse selection processing. Because a delay only for a path memory occurs in the binarization of a PRML decoder 14, the delay apparatus 26 adjusts the delay between the selected error pulse and the PRML decoder 14.

Figure 14:
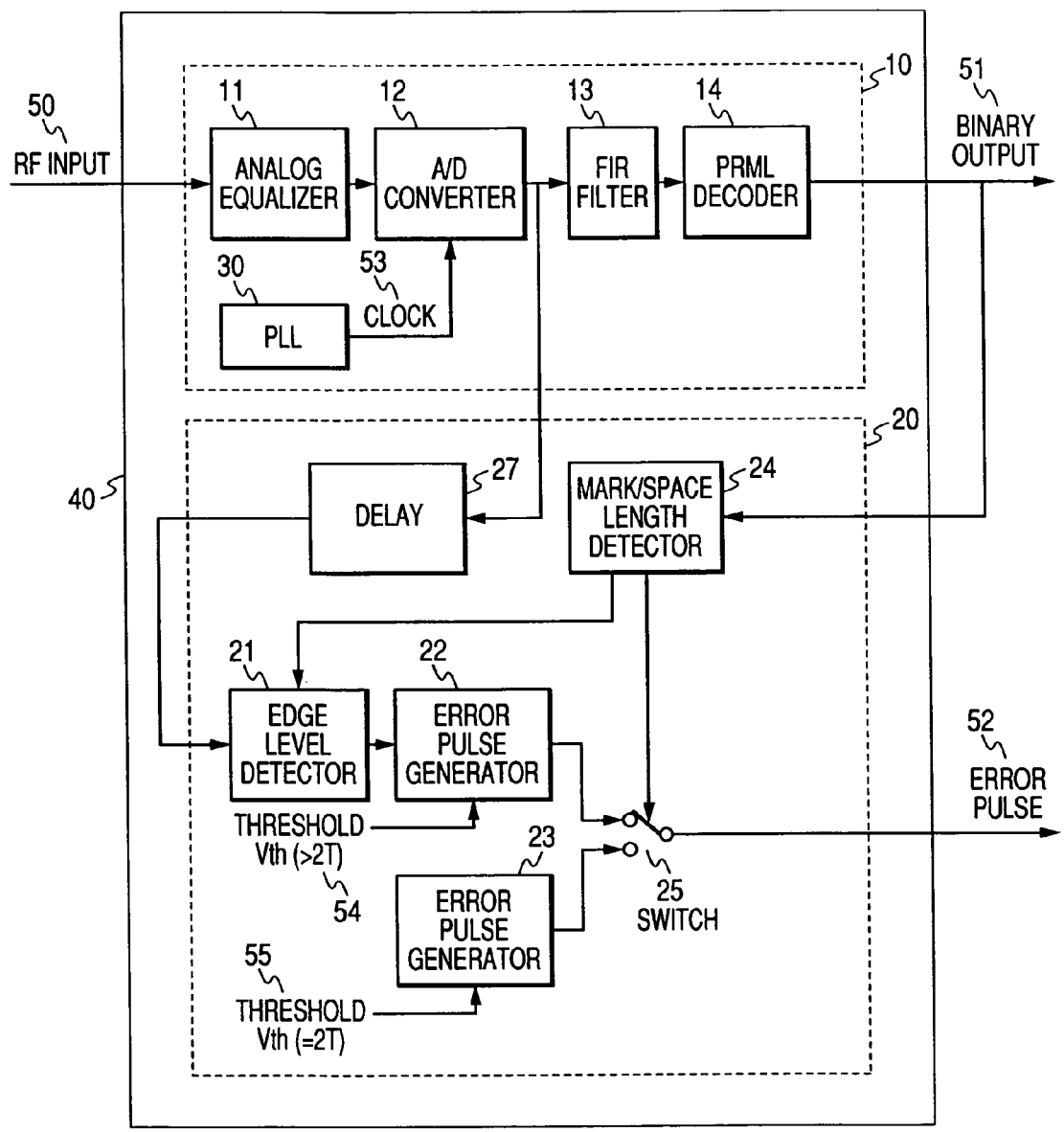
FIG. 14 is a block diagram showing an embodiment of the trial writing circuit suitable for the optical disk apparatus of the present invention.

FIG. 14 is also an embodiment showing another configuration of the reproducing signal processing circuit of the present invention. The characteristic of this configuration is in that the mark/space length detector 24 judges the selection of an error pulse using a binary signal 52 output from the PRML decoder 14. In the configuration in FIG. 13, selection processing was executed by the same binarization processing as a direct slice method, but a binarization result having a smaller error is obtained by using the binarization result with PRML. In particular, when the jitter of the 2 Tw signal is bad, such as in the case of a Blu-ray Disc, the effect is large. Because the binarization result by the PRML is used, the delay apparatus 27 is arranged before the edge level detector 21 and must execute a delay adjustment to adjust a delay by the foregoing path memory. The binarization result by the PRNL can be used also for the edge judgment of the edge level detector 21 by such configuration. Because the configuration is complicated, a delay adjuster must be provided between the binarization signal 51 and a logical signal processing circuit 60 (though not illustrated). A judgment delay is followed in the judgment of the mark/space length. Accordingly, in order to synchronize the timing of an error pulse 52 and the binary signal 51, the delay only for the judgment delay must be added to the binary signal 51.

Figure 15:
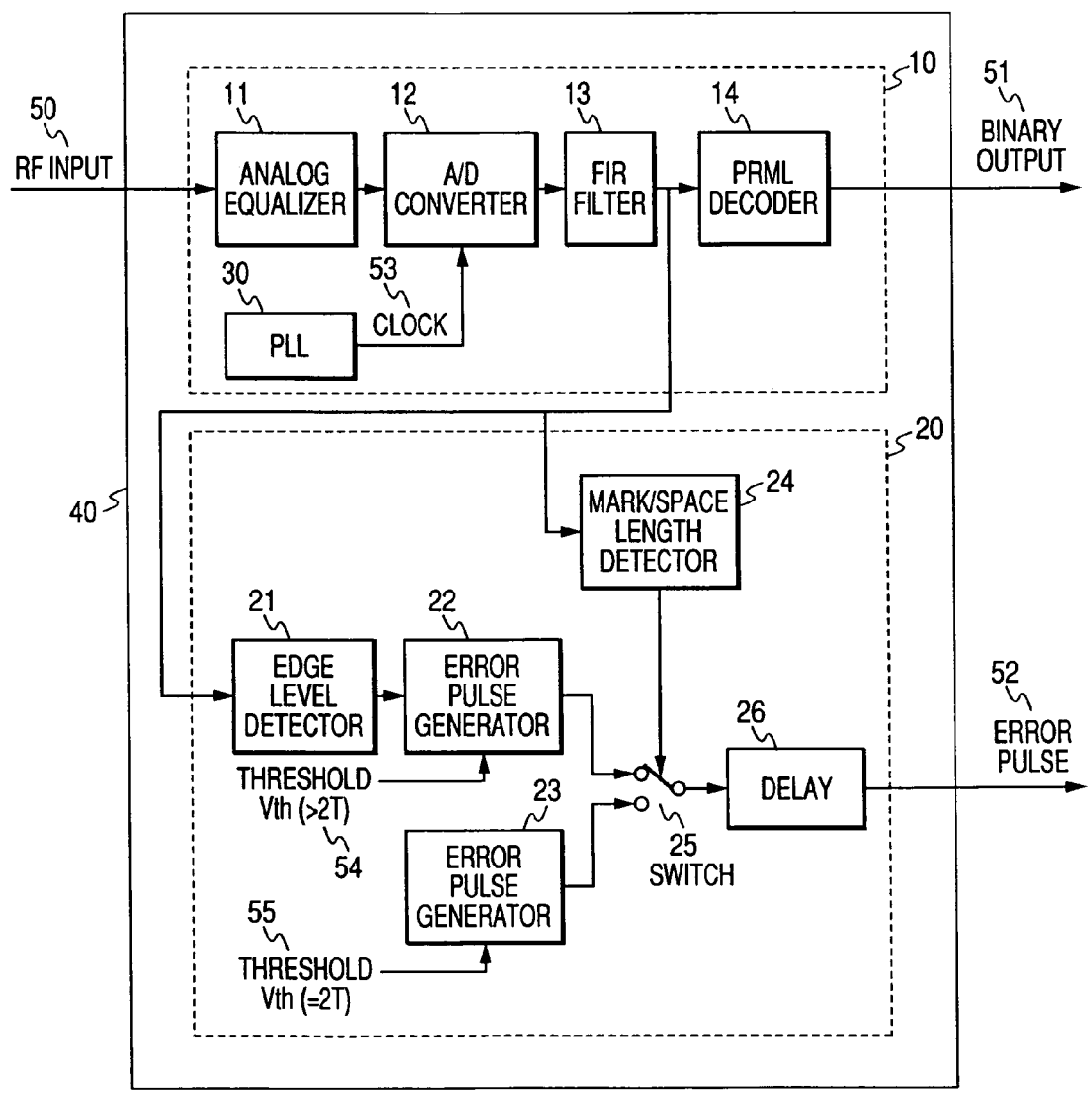
FIG. 15 is a block diagram showing an embodiment of the trial writing circuit suitable for the optical disk apparatus of the present invention.
Figure 16:
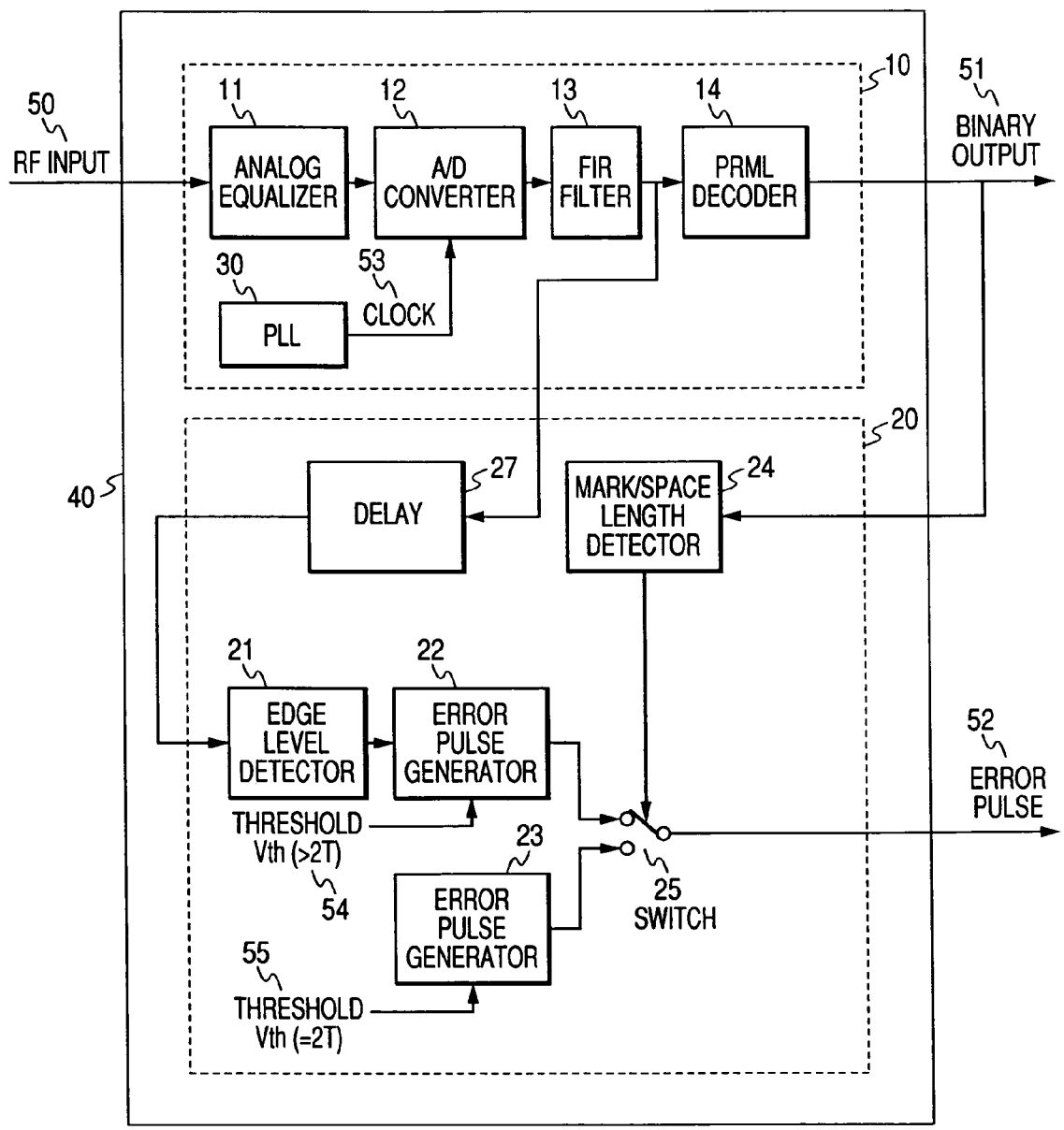
FIG. 16 is a block diagram showing an embodiment of the trial writing circuit suitable for the optical disk apparatus of the present invention.

FIGS. 15 and 16 are also examples showing other configurations of the reproducing signal processing circuit of the present invention. These correspond to FIGS. 13 and 14 respectively, and an error pulse is detected from a signal after a FIR filter 15. For example, when a group delay can be found in a head amplifier, and it is corrected by the FIR filter 15, the error pulse must be detected using the signal after the FIR filter in consideration of the recording/reproduction compatibility.

Second Embodiment

Trial Writing

A trial writing method and circuit that makes effect of a processing circuit and a software resource of a conventional error pulse, and guarantees recording/reproduction compatibility, were described above. Here, an example in which trial writing was executed using such a method is described.

Figure 12:
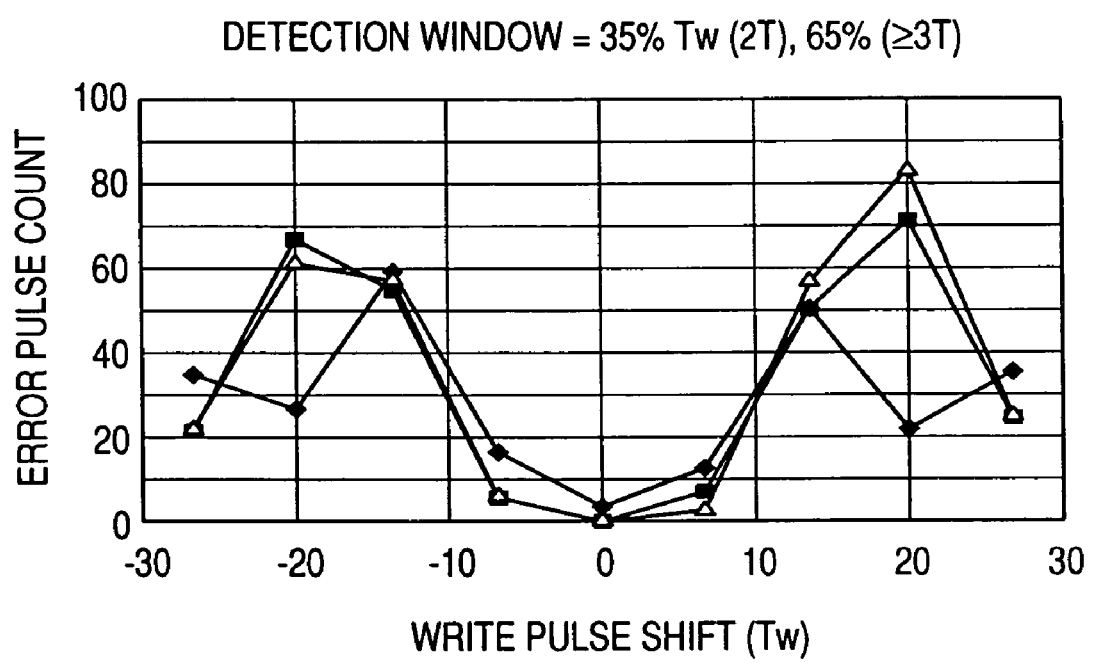
FIG. 12 is a graph which shows a result in which a relationship exists between the write pulse condition and the error pulse count using two types of the error pulse thresholds.
Figure 17A:
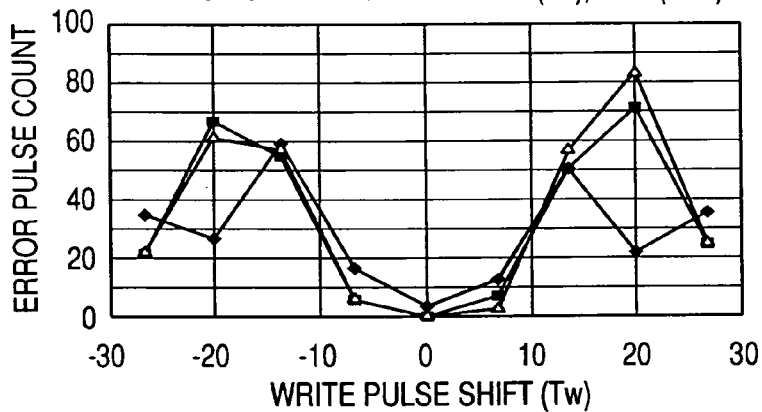
FIGS. 17A to 17C are graphs which show an example of trial writing.
Figure 17B:
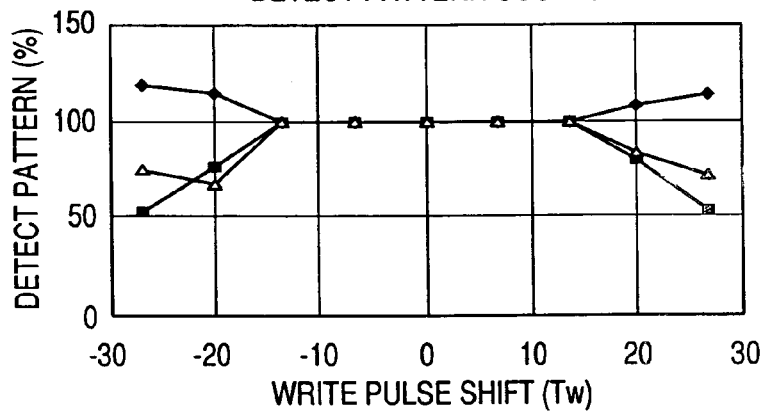
Figure 17C:
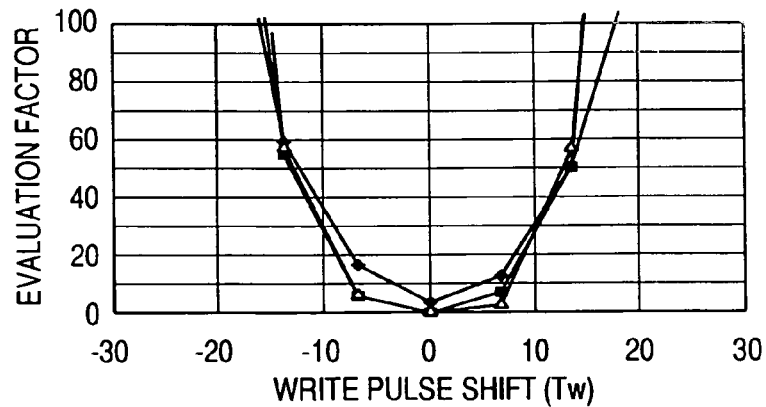

FIGS. 17A to 17C show an example in which the result in FIG. 12 is further improved. FIG. 17A is the same as FIG. 12, and shows a result in which the detection threshold of the 2 Tw mark is set to 65% Tw, and the detection threshold of the mark of 3 Tw or more is set to 35%. The reduction of the error pulse that can be seen when the write pulse shift is 20% or more is affected, for example, when the 3 Tw mark followed by the 3 Tw space is judged by the 4 Tw mark followed by the 3 Tw space, and a reproduction error occurs. FIG. 17B shows the ratio of the number of respective patterns included in a reproducing signal measured by a pattern counter 65 shown in FIG. 1 to the number of respective patterns included in a recorded signal row. When a write pulse shift exceeds 200%, error discrimination occurs, and the number of reproduced patterns proves to be shifted from 100%. Hereupon, FIG. 17C shows a result in which the absolute value of a shift (=error discrimination) from 100% is multiplied by 10 as a penalty of the error discrimination of a pattern, is added to the measured error pulse count (this also calculates the ratio to the number of recording patterns), then is graphed as a new estimation index. The reduction of an error pulse that can be seen when the write pulse shift exceeds 20% cannot be found, for example, the optimum write pulse condition can be improved so as to be easily obtained using a simple method, such as a least square method.

FIGS. 18A and 18B are diagrams showing a concept of trial writing that optimizes a writing pulse condition. FIG. 18A shows an initial state and the distribution of a jitter when a specific edge is shifted. In the drawing, the edge shown as the hatched region outside an error pulse detection window clock period is counted as an error pulse. FIG. 18B shows the case where a write pulse is adjusted so that the error pulse count may be minimized when the trial writing is terminated. The distribution of the jitter enters an error pulse detection clock period and the edge shift is corrected.

Figure 19:
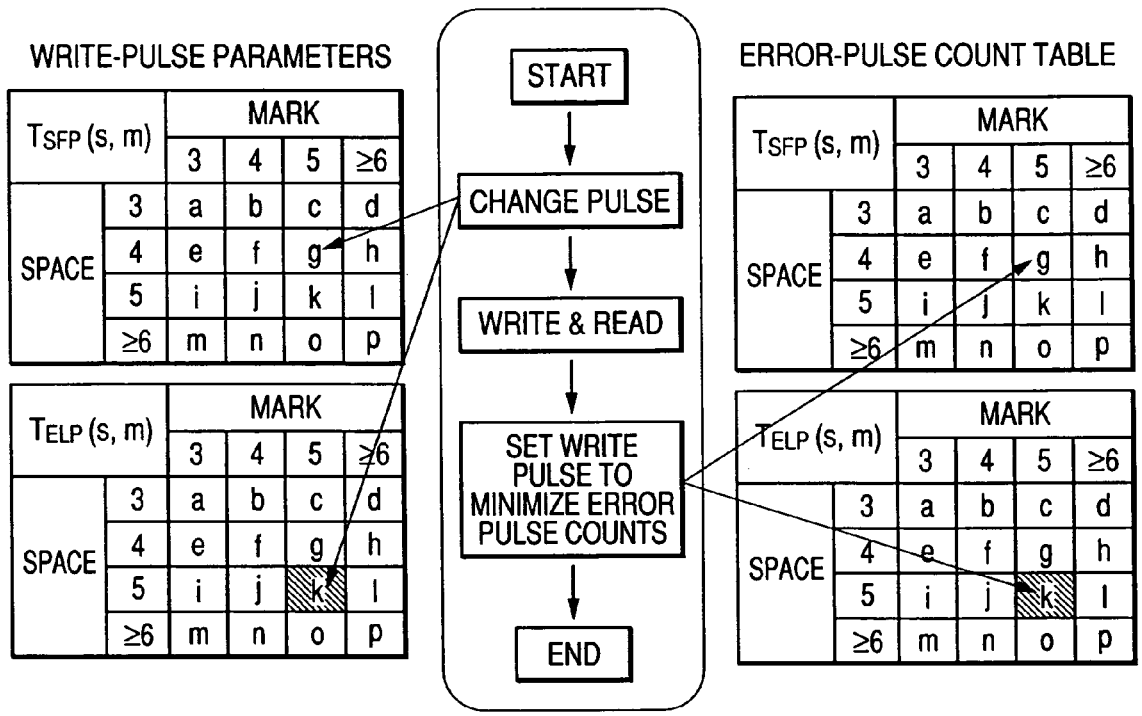
FIG. 19 is a diagram showing a flow of the trial writing that optimizes the write pulse condition.

FIG. 19 is a diagram showing a flow of trial writing that optimizes a write pulse condition. In case of a DVD-RAM, a write-pulse parameter is defined in a 4×4 table at the leading and trailing edges, respectively. An error pulse counter classifies an error pulse to the edge pattern of the same 4×4 table as this. A simple sequence first changes the write pulse condition, records it in an optical disk medium, reproduces the foregoing sector, estimates a counted value of the corresponding error pulse, and determines the write-pulse parameter so as to minimize this counted value. As clear from this example, because a write-pulse parameter and an error pulse that is its estimated value correspond 1 to 1, the trial writing time can be reduced by changing multiple write-pulse parameters at a time, and by performing recording/reproduction, then at the same time, thereby optimizing the multiple write-pulse parameters in parallel. Specifically, when the write-pulse parameter is determined sequentially from the end, a 2×-speed drive apparatus requires the processing time of 30 seconds to one minute. On the contrary, when parallel processing is executed by the present invention, the trial writing can be terminated for about one second.

Figure 20A:
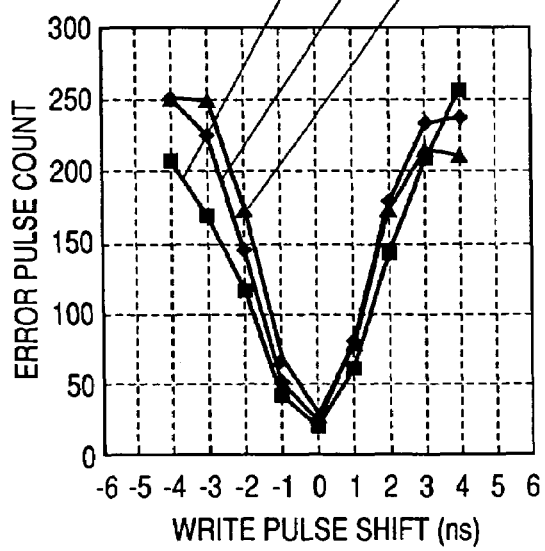
FIGS. 20A and 20B are diagrams which show an example of the trial writing that determines a write pulse of the 2×-speed DVD-RAM medium on the market.
Figure 20B:
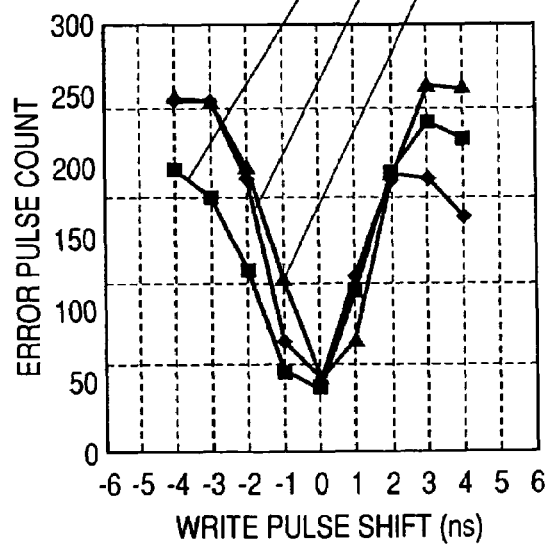

FIGS. 20A and 20B show an example of trial writing that determines 25 a write pulse of a commercially available 2×-speed DVD-RAM medium. The drawing collects, with regard to six patterns that have the 6 T space behind and before, the edge position of the write pulse and the result of the error pulse count. In the drawing, the zero point on the horizontal axis shows the determined condition. Thus, a write pulse condition is selected and the trial writing processing can be executed so that the error pulse count may be minimized.

Figure 21:
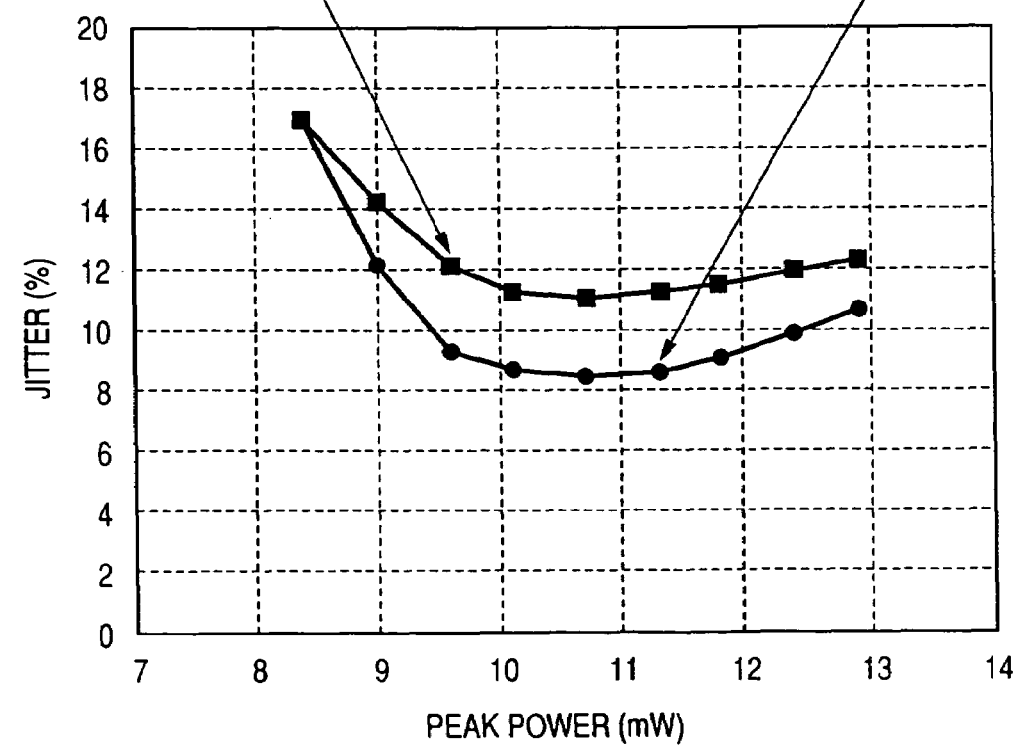
FIG. 21 is a diagram showing as an experimental result a difference in a recording power margin before and after the trial writing is executed.

FIG. 21 shows a difference in a recording power margin before and after trial writing is executed. After the 4×4 table of a write-pulse parameter is all determined by the foregoing trial writing processing, the relationship between recording power and jitter was measured. As shown in the figure, the jitter is improved by the trial writing of the present invention, and a satisfactory recording power margin can be obtained.

Third Embodiment

Optical Disk Apparatus

Figure 22:
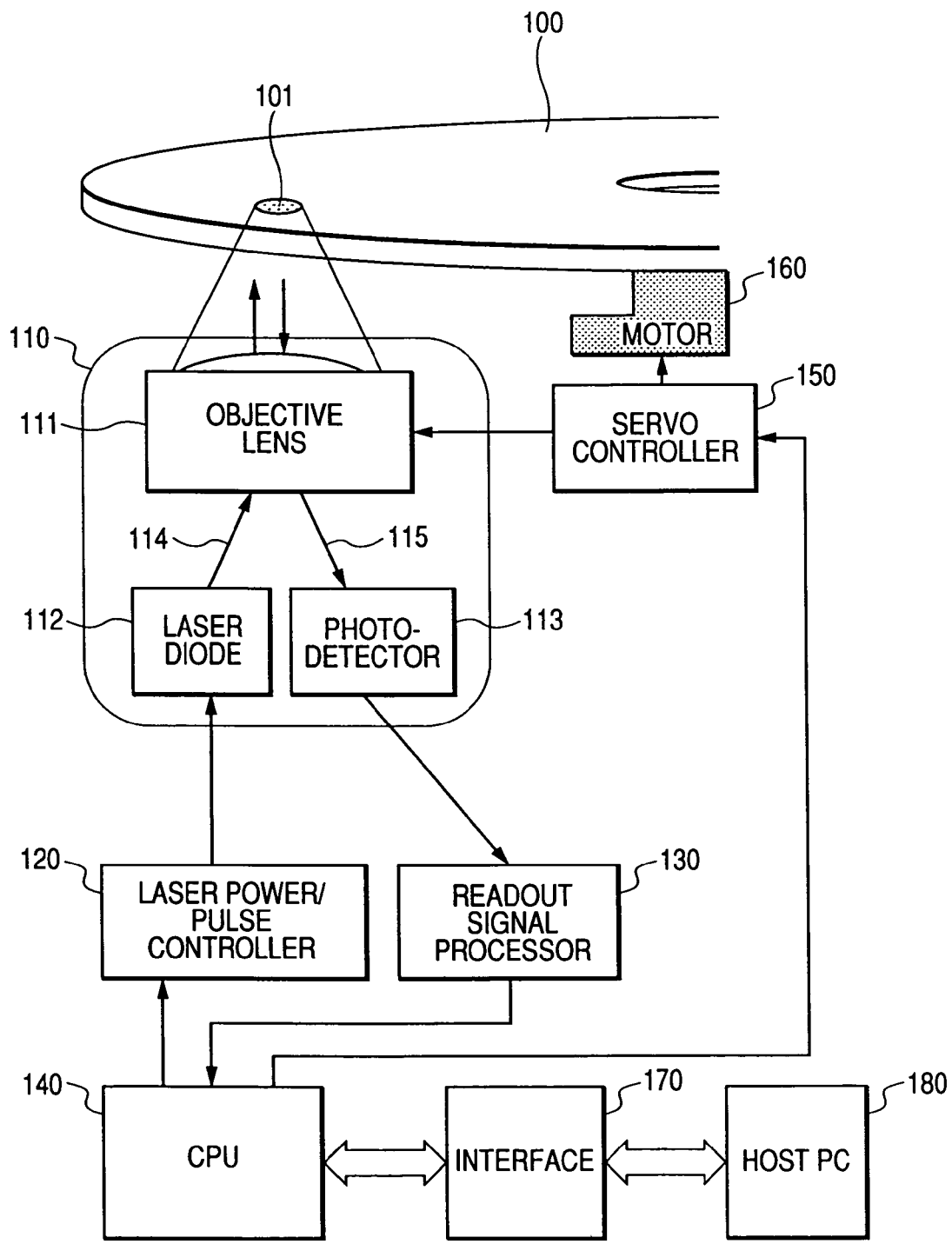
FIG. 22 is a block diagram showing an embodiment of the optical disk system of the present invention.

FIG. 22 shows an embodiment of an optical disk apparatus of the present invention. An optical disk medium 100 is rotated by a motor 160. A laser power/pulse controller 120 controls a current that flows into a semiconductor laser 112 inside an optical head 110, and it generates a laser beam 114 so as to produce an optical intensity instructed as by the CPU 140 in case of reproduction. The laser beam 114 is condensed by an objective lens 111, and it forms an optical spot 101 on the optical disk medium 100. Reflected light 115 from this optical spot 101 is detected by an optical detector 113 through the objective lens 111. The optical detector has multiple split optical detection elements. A reproducing signal processing circuit 130 reproduces information recorded in the optical disk medium 100 using a signal detected by the optical head 110. In case of recording, the laser power/pulse controller 120 converts predetermined recording data into a predetermined write pulse current, and it controls the current so that pulse light may exit from the semiconductor laser 112. The signal processing circuits 40 and 50 for the foregoing trial writing shown in FIG. 1 are incorporated in the reproducing signal processing circuit 130.

In the case of trial writing, a predetermined data pattern is recorded/reproduced according to the instruction of the CPU 140, and recording power and write pulse conditions are optimized using an error pulse as an index.

What is claimed is:

1. An optical disk apparatus that records and reproduces information by irradiating an optical disk medium with an optical laser pulse, and performs trial writing that optimizes the laser pulse irradiating condition, comprising:

a means of recording a predetermined trial writing pattern in a predetermined region of the optical disk medium changing the laser beam irradiating condition;

a means of reproducing the predetermined data, and obtaining a first reproducing signal;

a means of detecting an edge position of the first reproducing signal, and detecting an edge signal level;

a means of judging the edge signal level is outside the range of multiple thresholds, generating logical pulses for estimating quality of reproduced signal of the trial writing pattern;

a means of selecting a logical pulse from the plurality of logical pulses in accordance with a combination of patterns having mark length, or the front and rear space length and mark length of the edge;

a means of binarizing the first reproducing signal, and obtaining a binary data row; and a means of a data pattern from the binary data row in accordance with the front and rear space length and mark length of the edge, counting the selected logical pulse in units of the data patterns, and generating a count value table of the logical pulse, wherein the laser pulse irradiating condition is decided based on the selected logical pulse, and wherein the laser pulse irradiating condition is decided using the count value in the logical pulse table.

2. The optical disk apparatus according to claim 1, wherein the plurality of thresholds comprises a threshold for a 2Tw mark, and a threshold for 3Tw or more.

3. The optical disk apparatus according to claim 1, wherein the laser pulse irradiating condition is decided so that count values in the count value table of the logical pulse may be minimized, respectively.

4. The optical disk apparatus according to claim 1, further comprising:

a means of equalizing the first reproducing signal by an analog filter and a second reproducing signal;

a means of digitalizing the second reproducing signal by an A/D converter and obtaining a third reproducing signal;

a means of equalizing the third reproducing signal by a FIR filter and obtaining a fourth reproducing signal; and a means of binarizing the fourth reproducing signal 25 through a PRML circuit, and obtaining a binary data row, wherein the means of selecting the edge signal level detects the edge position of the third or the fourth reproducing signal and an edge signal level.

5. The optical disk apparatus according to claim 4, wherein the means of the logical pulse selects a logical pulse using the fourth reproducing signal or the binary data row.

6. An optical disk apparatus that records and reproduces information by irradiating an optical disk medium with an optical laser pulse, and performs trial writing that optimizes the laser pulse irradiating condition, comprising:

a means of recording a predetermined trial writing pattern in a predetermined region of the optical disk medium changing the laser beam irradiating condition;

a means of reproducing the predetermined data, and 15 obtaining a reproducing signal;

a means of detecting an edge position of the reproducing signal, and detecting an edge signal level;

a means of judging that the edge signal level is provided outside the range of two thresholds in accordance with the case where mark length is the minimum run length of a modulation code to be recorded, and the case other than the above, and generating two logical pulses for estimating quality of reproduced signal of the trial writing pattern;

a means of selecting a logical pulse from the two logical pulses in accordance with a combination of patterns having mark length, or the front and rear space length and mark length of the edge; and a means of judging a data pattern from the binary data row in accordance with the front and rear space length and mark length of the edge, counting the selected logical pulses in units of the data patterns, and generating a count value table of the logical pulse, wherein the laser pulse irradiating condition is decided based on the selected logical pulse, and wherein the laser pulse irradiating condition is decided using the count value in the logical pulse table.

7. The optical disk apparatus according to claim 6, wherein the plurality of thresholds comprises a threshold for a 2Tw mark, and a threshold for 3Tw or more.

8. The optical disk apparatus according to claim 6, wherein the laser pulse irradiating condition is decided so that count values in the counted value table of the logical pulse may be minimized, respectively.

* * * * *